STEWART & TILLEY.
Coffee Pot.
No. 91,879.
Patented June 29, 1869.
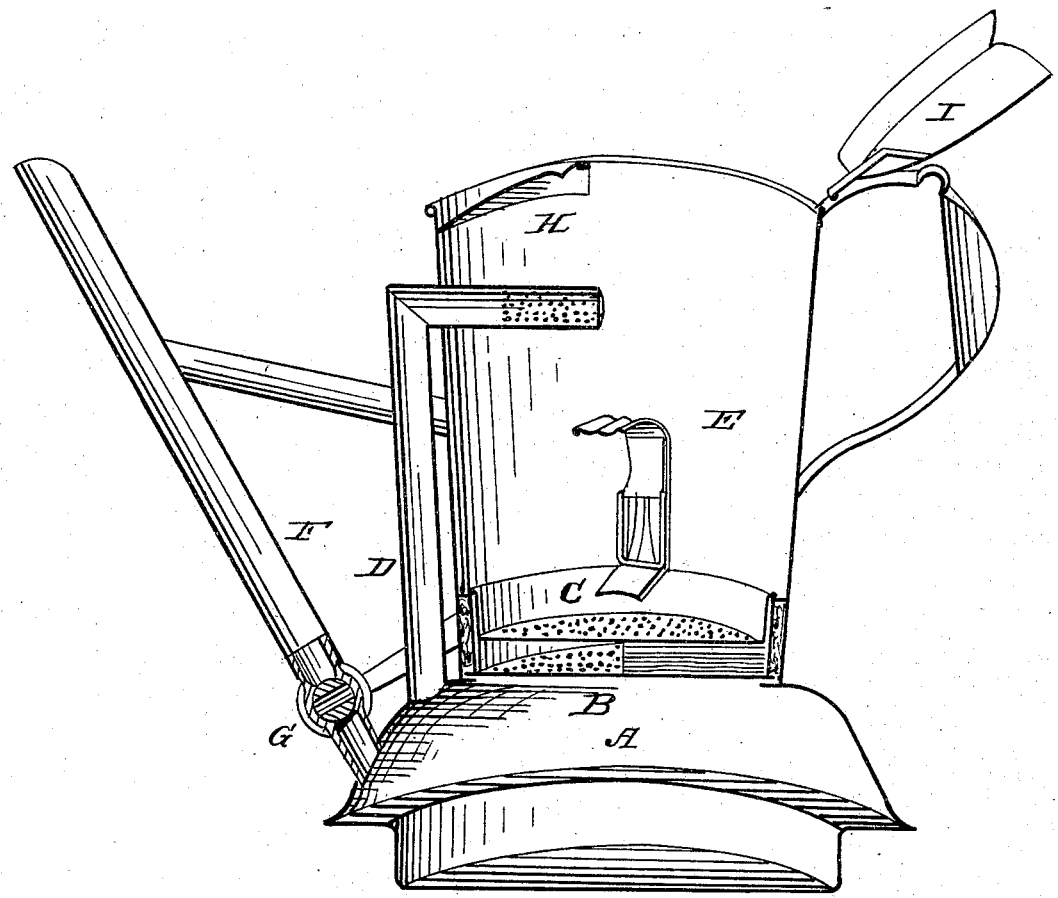
Witnesses
H. F. Eberts
Jas. I. Day
Inventors
W. H. Stewart
J. H. Tilley
Per attorney
Thos. S. Sprague

United States Patent Office.

W. H. STEWART AND J. H. TILLEY, OF ORION, WISCONSIN.

Letters Patent No. 91,879, dated June 29, 1869.

COFFEE-BOILER.

The Schedule referred to in these Letters Patent and making part of the same.

*To whom it may concern:*

Be it known that we, W. H. STEWART and J. H. TILLEY, of Orion, in the county of Richland, and State of Wisconsin, have invented a new and useful Improvement in Coffee-Boilers; and we do declare that the following is a true and accurate description thereof, reference being had to the accompanying drawings, and to the letters of reference marked thereon, and being a part of this specification.

The nature of this invention relates to an improved construction of a boiler, in which to steep coffee, in which a clear coffee can be produced, in greater quantity and better in flavor than can be obtained by any other known process.

The invention consists in a new and novel arrangement of its various parts, the whole so arranged that a constant current of boiling water and steam is passed downward through the ground coffee, which is contained in a proper receptacle until the whole of the strength of the coffee has been extracted, leaving a perfectly-clear liquid as the result, entirely free from sediment or "grounds."

A, in the drawings, represents the boiling-chamber, provided with the usual sink, to fit into the stove.

B is a diaphragm, made of perforated tin, or any other suitable material, and is made to fit closely into the upper part of the boiler, as shown in the drawings. If necessary, this diaphragm may be made to fit more closely, by means of suitable packing around its periphery, and within it is provided a suitable recess, which should be filled with canton flannel, or any other proper material for filtering.

The diaphragm is provided with a recessed chamber, C, the bottom of which is also made of perforated tin, and within which is placed the ground coffee.

Any suitable means may be adopted for holding this diaphragm in place while in use.

D is a conducting-pipe, leading from the boiling-chamber A to the open chamber E, above the diaphragm, and its upper end, where it projects into the open chamber, is made also of perforated tin, or covered with a strainer, to prevent any coffee, which may be floating in the open chamber, from entering said pipe.

F is a spout, provided with a proper cock, G, through which the coffee, when made, may be drawn from the lower chamber A, care being taken to keep the cock G closed while the coffee is being boiled.

H is a solid and partial diaphragm, rigidly secured to the walls of the boiler, immediately over the top end of the conducting-pipe, and I is a proper cover to the whole, suitably hinged to the top.

Care should be taken to make the diaphragm and filter sufficiently compact in its position to prevent the escape of steam from the lower to the upper compartments.

The diaphragm being in place, the ground coffee should be placed in the recess, and a suitable amount of hot water poured thereon, which will run down through the coffee and filter into the lower compartment. Then close the cover, and place the boiler over a fire.

When ebullition takes place, the steam, being obstructed in its upward pressure by the diaphragm, will, by expansion, cause the boiling water to run up through the conducting-pipe, whence it will be discharged upon the coffee, and again filter through the same into the lower compartment, to be again sent up through the pipe, and this process can be continued until the whole strength of the coffee has been extracted, when the diaphragm and coffee-grounds may be lifted out and emptied, leaving in the boiler a clear and pure liquid.

What we claim as our invention, and desire to secure by Letters Patent, is—

The construction of a coffee-boiler, with the parts A, B, C, D, E, F, G, H, and I, arranged substantially as described, and operating for the purposes set forth.

W. H. STEWART.
J. H. TILLEY.

Witnesses:
LEVI HOUTS,
ORLANDO HOUTS.